Patented May 30, 1950

2,509,248

UNITED STATES PATENT OFFICE 2,509,248

PROCESS FOR PRODUCING $\Delta^{9,11}$-3($\alpha$)-HYDROXY-17-KETOETIOCHOLENE

Lewis Hastings Sarett, Princeton, N. J., assignor to Merck & Co., Inc., Rahway, N. J., a corporation of New Jersey No Drawing. Application September 5, 1947, Serial No. 772,469

6 Claims. (Cl. 260—397.4)

This invention relates generally to the preparation of new compounds having male sex hormone activity and, more particularly to the synthesis of $\Delta^{9,11}$-3($\alpha$)-hydroxy-17-ketoetiocholene.

This compound $\Delta^{9,11}$-3($\alpha$)-hydroxy-17-ketoetiocholene isolated from human urine, can be represented by the following formula:

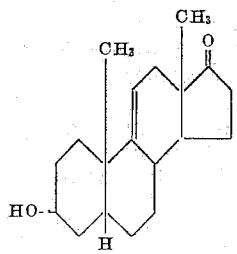

This compound characterized by male sex hormone activity has been available only in minute quantities due to the difficulty of isolating said compound from natural sources. In an attempt to render this compound available in appreciable quantities, I have now found that I can prepare this substance synthetically from suitable starting materials such as 3($\alpha$)-acetoxy-11,17-diketoetiocholane. In preparing this starting material in a preferred manner, $\Delta^{17}$-3($\alpha$)-acetoxy-11-keto-pregnene which in turn can be prepared in accordance with the method described in my copending application Serial No. 772,468 filed September 5, 1947, now abandoned, is treated with ozone. The resulting neutral fraction is treated with acetic anhydride and pyridine to yield the desired 3($\alpha$)-acetoxy 11,17 diketoetiocholane.

In carrying out the present invention in a preferred manner, 3($\alpha$)-acetoxy 11,17 diketoetiocholane is first subjected to a vigorous reduction in the presence of a suitable catalyst such as platinum and the like, whereby the corresponding 11,17 dihydroxy compound is formed. When this dihydroxy compound is treated with a mild oxidizing agent, the hydroxy group in the 17-position is oxidized to a keto group, the hydroxy group in the 11-position remaining unchanged.

While I prefer to use aluminum isopropoxide in acetone to effect the partial oxidation, other similar mild oxidizing agents can be used. Suitable oxidizing agents include other aluminum alcohol derivatives in the presence of benzaldehyde, acetone, or higher ketones, as for example, aluminum phenoxide and acetone, or aluminum t-butoxide and benzaldehyde. Preferably, the partial oxidation is carried out by refluxing a mixture of 3($\alpha$) - acetoxy - 11,17 - dihydroxy - etiocholane, dry benzene, anhydrous acetone and a mild oxidizing agent. Upon evaporation of the solvent, preferably in vacuo, the residue is dissolved in ether. The ethereal solution is first washed with dilute hydrochloric acid then with water and finally evaporated to dryness. The residue, dissolved in methanol, is then separated into ketonic and non-ketonic fractions with Girard's reagent in the conventional manner and the ketonic fraction is chromatographed over acid washed alumina. The crystalline fraction is then eluted with ether and ether-chloroform mixtures. Recrystallization from acetone and from benzene yields pure 3($\alpha$)-acetoxy-11-hydroxy-17-ketoetiocholene which is treated with a dehydrating agent such as phosphorus oxychloride, thionyl chloride and the like resulting in the formation of a double bond in the 9–11 position. Preferably, this reaction is carried out by dissolving the 3($\alpha$)-acetoxy 11-hydroxy-17-ketoetiocholane in dry pyridine and reacting with the dehydrating agent at room temperature. The resulting solution is first diluted with water, then extracted with ether, whereupon the solvent is evaporated. The residue is chromatographed and the non-crystalline fraction is dissolved in methanol, treated with an aqueous solution of potassium carbonate or other suitable saponifying agents. Recrystallization from dilute alcohol and from ether-petroleum ether mixture yields pure $\Delta^{9,11}$-3($\alpha$)-hydroxy-17-ketoetiocholene M. P. 155.5°±2°.

The following examples illustrate methods of carrying out the present invention, but it is to be understood that these examples are given by way of illustration and not of limitation.

EXAMPLE I

*3($\alpha$)-acetoxy-11,17-dihydroxyetiocholane*

A solution of 2.0 g. of 3($\alpha$)-acetoxy-11,17-diketoetiocholane in 50 cc. of acetic acid was shaken under hydrogen with 800 mg. of previously reduced platinum (Adams catalyst). After 3 hours the reduction was complete. The solution was then filtered, concentrated to dryness in vacuo, dissolved in ether, washed with dilute sodium carbonate and with water, and concentrated to a small volume on the steam bath. The addition of petroleum ether gave 1.85 g. of 3($\alpha$)-acetoxy-11,17-dihydroxy etiocholane of crystals, M. P. 183–185°. After several recrystallizations from dilute alcohol and from acetone-petroleum ether, the melting point was 198–200°. Anal.: Calcd. for $C_{21}H_{34}O_4$: C, 71.96; H, 9.78. Found: C, 72.21; H, 9.73.

EXAMPLE II

*3($\alpha$)-acetoxy-11-hydroxy-17-ketoetiocholane*

A mixture of 1.5 g. of 3($\alpha$)-acetoxy-11,17-dihydroxyetiocholane, 80 cc. of dry benzene, 40 cc. of anhydrous acetone and 3.0 g. of aluminum isopropoxide was refluxed overnight. Most of the solvent was then removed in vacuo, the residue taken up in ether, washed with dilute hydrochloric acid and with water and the ethereal solution concentrated to dryness. The residue was dissolved in 15 cc. of methanol and treated with 2.0 g. of Girard's reagent together with 0.8 cc. of acetic acid. After refluxing for 30 minutes, the solution was concentrated to half volume in vacuo, then poured into a mixture of ice water and ether in a separatory funnel. After thorough mixing the aqueous layer was removed and acidified with 20 cc. of 4 N hydrochloric acid.

After standing several hours at room temperature the acidified aqueous layer was extracted with 200 cc. portions of ether. The ethereal layer was washed with dilute sodium carbonate then with water and concentrated to dryness. The residue (500 mg.) was then heated with pyridine-acetic anhydride for 10 minutes on the steam bath to replace acetoxy groups lost by hydrolysis. (This usually amounts to 10% when the Girard's complex is worked up in the manner described above.) Careful addition of water then gave 440 mg. of crystals, M. P. 223–229°. This material was chromatographed over 8 g. of alumina (acid washed). The crystalline fraction, eluted with ether-chloroform mixtures, was combined and recrystallized from acetone and from benzene giving 222 mg. 3($\alpha$)-actoxy-11-hydroxy-17-ketoetiocholane, M. P. 237–238°. For analysis a sample was dried in vacuo at 140°. Anal.: Calcd. for $C_{21}H_{32}O_4$: C, 72.40; H, 9.26. Found: C, 72.50; H, 10.04.

EXAMPLE III $\Delta^{9,11}$ 3($\alpha$)-hydroxy-17-ketoetiocholene

A solution of 170 mg. of 3($\alpha$)-acetoxy-11-hydroxy-17-ketoetiocholane in 1 cc. of dry pyridine was treated with 0.2 cc. of phosphorus oxychloride. After standing at room temperature overnight, the solution was diluted with water and extracted with ether. The washed ethereal solution was concentrated to dryness and the residue (160 mg.) chromatographed. The more easily eluable fraction consisted of a colorless oil (146 mg.) which could not be obtained in crystalline form. In addition 10 mg. of starting material was obtained. The non-crystalline fraction was dissolved in 5 cc. of methanol and treated with a solution of 200 mg. of potassium carbonate in 2 cc. of water. After standing at room temperature overnight, the solution was concentrated to half volume in vacuo and water added. The crystalline precipitate weighed 114 mg. and melted at 169–171°. After recrystallization from dilute alcohol and from ether-petroleum ether, it melted at 171°. After recrystallization from dilute alcohol and from ether-petroleum ether, it melted at 171°[$\alpha$]$_d^{25}$ = +155.5°±2°. Anal.: Calcd. for $C_{19}H_{28}O_2$: C, 79.13; H, 9.85. Found: C, 79.61, 79.59; H, 9.87, 10.15.

The compound $\Delta^{9,11}$-3($\alpha$)-hydroxy-17-ketoetiocholene prepared in accordance with the method herein described has been found to be identical with harmonal material isolated from natural sources. Various changes and modifications may be made in my process for preparing $\Delta^{9,11}$-3($\alpha$)-hydroxy-17-ketoetiocholene, as described above, which would nevertheless fall within the scope of my invention. It is my intention that such changes and modifications, to the extent that they are within the scope of the appended claims, shall be considered as part of my invention.

I claim:

1. The process for the preparation of $\Delta^{9,11}$-3($\alpha$)-hydroxy-17-ketoetiocholene which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with aluminum isopropoxide in the presence of acetone, reacting the resulting 3($\alpha$)-acetoxy-11-hydroxy-17-ketoetiocholane with a dehydrating agent selected from the group which consists of phosphorus oxychloride and thionyl chloride and saponifying the resulting $\Delta^{9,11}$-3($\alpha$)-acetoxy-17-ketoetiocholene.

2. The process for the preparation of $\Delta^{9,11}$-3($\alpha$)-hydroxy-17-ketoetiocholene which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with aluminum isopropoxide in the presence of acetone, reacting the resulting 3($\alpha$)-acetoxy-11-hydroxy-17-ketoetiocholane with phosphorus oxychloride and saponifying the resulting $\Delta^{9,11}$-3($\alpha$)-acetoxy-17-ketoetiocholene.

3. The process for the preparation of $\Delta^{9,11}$-3($\alpha$)-hydroxy-17-ketoetiocholene which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with aluminum isopropoxide in the presence of acetone, reacting the resulting 3($\alpha$)-acetoxy-11-hydroxy-17-ketoetiocholane with thionyl chloride and saponifying the resulting $\Delta^{9,11}$-3($\alpha$)-acetoxy-17-ketoetiocholene.

4. The process for the preparation of $\Delta^{9,11}$-3($\alpha$)-hydroxy-17-ketoetiocholene which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with aluminum isopropoxide in the presence of acetone, reacting the resulting 3($\alpha$)-acetoxy-11-hydroxy-17-ketoetiocholane with phosphorus oxychloride and saponifying the resulting $\Delta^{9,11}$-3-($\alpha$)-acetoxy-17-ketoetiocholene in the presence of alkali metal carbonate.

5. The process for the preparation of $\Delta^{9,11}$-3($\alpha$)-hydroxy-17-ketoetiocholane which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with aluminum isopropoxide in the presence of acetone, reacting the resulting 3($\alpha$)-acetoxy-11-hydroxy-17-ketoetiocholane with phosphorus oxychloride and saponifying the resulting $\Delta^{9,11}$-3($\alpha$)-acetoxy-17-ketoetiocholene in an aqueous solution of potassium carbonate.

6. The process for the preparation of $\Delta^{9,11}$-3($\alpha$)-hydroxy-17-ketoetiocholene which comprises reducing 3($\alpha$)-acetoxy-11,17-diketoetiocholane in the presence of a platinum catalyst to form 3($\alpha$)-acetoxy-11,17-dihydroxyetiocholane, treating said dihydroxyetiocholane with an aluminum alcohol derivative in the presence of a substance selected from aldehydes and ketones, reacting the resulting 3($\alpha$)-acetoxy-11-hydroxy-17-ketoetiocholane with a dehydrating agent selected from the group which consists of phosphorus oxychloride and thionyl chloride, and saponifying the resulting $\Delta^{9,11}$-3($\alpha$)-acetoxy-17-ketoetiocholene.

LEWIS HASTINGS SARETT.

No references cited.